Feb. 26, 1974  D. W. RAHMES  3,794,537
METHOD OF MAKING ABSORBENT PADS
Original Filed April 24, 1970
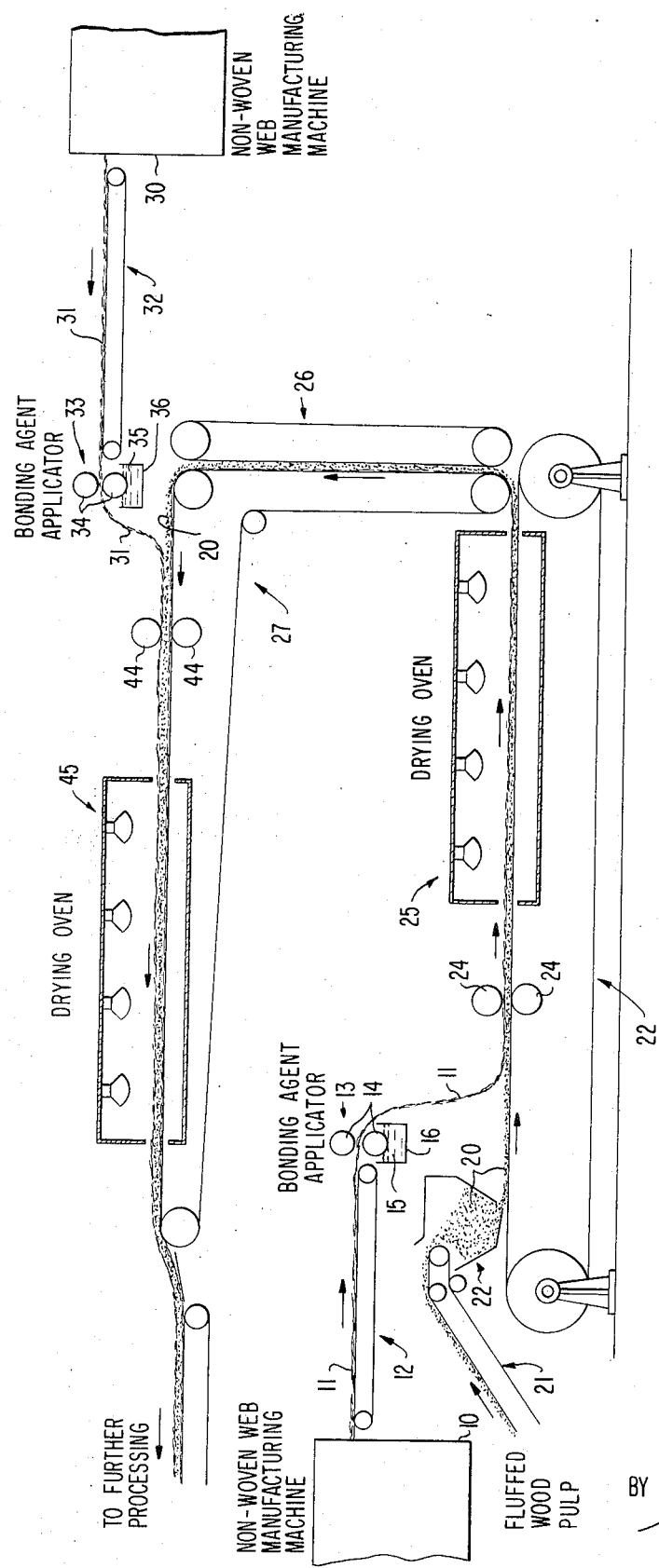
INVENTOR
DONALD W. RAHMES
BY Birch, Swindler,
McKie & Beckett
ATTORNEYS United States Patent Office 3,794,537
Patented Feb. 26, 1974

3,794,537
METHOD OF MAKING ABSORBENT PADS
Donald Wilber Rahmes, Stamford, Conn., assignor to Georgia-Pacific Corporation, Portland, Oreg.
Continuation of abandoned application Ser. No. 31,509, Apr. 24, 1970. This application Mar. 21, 1972, Ser. No. 236,795
Int. Cl. B32b 3/26
U.S. Cl. 156—62.8                                    12 Claims

ABSTRACT OF THE DISCLOSURE

A method of making an absorbent pad comprising the steps of applying a bonding agent to a non-woven fiber web, depositing the non-woven web on one side of a layer of absorbent material, and curing the bonding agent to bond the non-woven web to the absorbent material. A three-ply pad can be made by similarly bonding a second non-woven fiber web to the other side of the absorbent material layer.

This is a continuation application of co-pending application Ser. No. 31,509, filed Apr. 24, 1970, now abandoned.

BACKGROUND OF THE INVENTION

Field of the invention

This invention relates generally to the manufacture of absorbent pads, and more particularly to a method of making such pads in which the use of paper making machinery is eliminated.

DESCRIPTION OF THE PRIOR ART

There exists a substantial market for strong, highly absorbent disposable pads. Such pads frequently are tailored for specific tasks, especially insofar as strength and endurance properties are concerned. For example, an inexpensive machinery wiper is of little value if it disintegrates during use. To provide a highly absorbent pad which is durable, the prior art has used cloth or paper as a backing for contiguous layers of various absorbent materials, or as an enclosure for such materials. The cost of such pads is rather high because the raw material and machinery needed to produce the cloth or paper are relatively expensive. Also, the processes employed in the prior art for assembling absorbent pads are relatively complex.

Attempts to utilize non-woven webs as a backing for the absorbent materials have been made in the prior art, but the methods used have remained quite complex and the resulting products unnecessarily sophisticated.

SUMMARY OF THE INVENTION

The present invention provides a method of making an absorbent pad utilizing loose absorbent material and at least one non-woven fiber web to provide a backing for the absorbent material. The properties of the non-woven web, and particularly the tensile strength thereof, may be controlled to optimize the characteristics of the pad for specific applications. A conventional bonding agent is applied to the web, and the saturated web is then deposited on one side of a layer of fluffed absorbent material of substantially uniform thickness. The web and absorbent material layer are lightly pressed together and then passed through a means for curing the bonding agent, such as a drying oven, to bond the fibers of the web to each other and to the absorbent material. If a three-ply pad is desired, a second non-woven fiber web may be bonded in a similar manner to the other side of the absorbent material layer.

A significant advantage of the method is that the use of expensive paper making machinery is eliminated. Also, the typical apparatus used for performing the method is relatively simple and economical to operate.

The method takes advantage of newly developed techniques for making non-woven fiber webs in order to provide absorbent pads which are tailored precisely to the needs of particular applications. The webs preferably are made from relatively long fibers of a synthetic or natural material, such as rayon or cotton. The absorbent material conveniently comprises fluffed wood pulp, which is relatively inexpensive and highly absorbent.

With the foregoing in mind, it is an object of the present to provide an improved method of making an absorbent pad, which method is relatively simple and economical.

It is another object of the invention to provide a method of making an absorbent pad, which method utilizes the advantageous properties of non-woven fiber webs.

It is a further object of the invention to provide a method of manufacturing an absorbent pad in which loose, fluffed absorbent material is bonded to at least one non-woven fiber web.

It is an additional object of the invention to provide a method of making an absorbent pad, which pad may be tailored precisely for particular applications.

These and other objects of the invention will become apparent upon a consideration of the following detailed description thereof given in connection with the following drawings.

BRIEF DESCRIPTION OF THE DRAWINGS

FIG. 1 is a schematic view of an apparatus which may be used to manufacture an absorbent pad in accordance with the method of this invention.

FIG. 2 is a cross-sectional view of the absorbent pad manufactured by the apparatus illustrated in FIG. 1.

DESCRIPTION OF THE PREFERRED EMBODIMENT

The method of the invention obviates the problems associated with prior art methods of making absorbent pads, and takes particular advantage of the desirable characteristics of non-woven fiber webs and fluffed absorbent materials. The absorbent pad made by the method of the invention is a laminate composed of an absorbent material layer and at least one non-woven fiber web backing ply. The absorbent material may be loosely divided, and need not be pre-conditioned.

As previously mentioned, the non-woven fiber webs may have tensile strength characteristics tailored precisely for particular applications. Such webs may have the fibers thereof randomly oriented and intertwined, providing substantially uniform tensile strength in all directions, or may have fibers thereof oriented in a particular direction, in which instance the maximum tensile strength of the web is in the direction of fiber orientation. Non-woven fiber webs of these types and the method of making such webs are described in detail in copending application Ser. No. 31,560, filed Apr. 24, 1970, now abandoned, and owned by the assignee of the present application.

A non-woven fiber web having random fiber orientation, and the refore substantially uniform tensile strength in all directions, lends itself well for making a two-ply pad having a single backing ply and a layer of absorbent material. However, if uniform tensile strength is not required, a non-woven fiber web having the fibers thereof oriented in a single direction, and therefore maximum tensile strength in such direction, may be used.

A three-ply pad can be made using two non-woven fiber webs, one such web being disposed on either side of the absorbent material layer. The webs employed in the three-ply pad may have the fibers thereof randomly oriented or oriented in a particular direction or directions. In the latter instance, it is advantageous, although not necessary, to have the fibers of one web oriented perpendicularly to the fibers of the other web, thus providing good over-all tensile strength. For example, the fibers of the first web may be oriented in the direction of the running length thereof, while the fibers of the second web may be oriented in the direction of the running width thereof.

The absorbent material can consist of any conventional absorbent material in virtually any form. However, the method is well suited for using a loose absorbent material, such as a fluffed wood pulp. The pulp can be produced in a hammermill or other conventional disintegrator. The fact that the method can utilize loose, fluffed absorbent material is a particular advantage, because the necessity of compacting or otherwise pre-conditioning the absorbent material, as required in many of the prior art methods, is eliminated.

The absorbent material is distributed in a substantially uniform layer on a production surface. Simultaneously, a bonding agent is applied to a non-woven fiber web. The bonding agent preferably is a conventional thermosetting adhesive. After the web has been saturated with the bonding agent, the web is deposited on one side of the absorbent material layer. The web and absorbent material layer preferably are then pressed together lightly in order to establish intimate contact therebetween. The bonding agent is then cured to bond the fibers of the web to each other and to the absorbent material. This latter step can be accomplished by heating the pad in a drying oven. A three-ply pad, in which the absorbent material is backed by two non-woven fiber webs, can be made by simply repeating the above-described bonding step with a second web on the other side of the absorbent material layer.

A variation of the aforementioned method can also be used to produce a three-ply pad. In this variation the first web, saturated with the bonding agent, is deposited on one side of the absorbent material layer in the same manner as described above. However, the bonding agent is only partially cured, for example, by air drying for a short period of time, to cure the agent only to the extent necessary to develop enough adhesion between the absorbent material and the web so that the resulting two-ply laminate may be handled. This two-ply laminate is then turned over to expose the opposite side of the absorbent material layer. The second web, also saturated with the bonding agent, is then deposited on the exposed side of the absorbent material layer, and the resulting three-ply laminate then heated in a drying oven, wherein curing of the bonding agent as applied to both the first and second webs is completed. The advantage offered by this variation is that only a single heating step is necessary.

An apparatus for performing the method of the invention is illustrated in FIG. 1. The apparatus includes a web manufacturing machine 10 of the type described in the aforementioned commonly owned application which produces a first non-woven fiber web 11 having the fibers thereof oriented in the desired manner. Web 11 is deposited on a delivery conveyor 12 which carries the web to a conventional bonding agent applicator 13 having co-operating rolls 14 and a tank 16 in which a supply of a conventional thermosetting liquid bonding agent 15 is disposed. Applicator 13 saturates web 11 with bonding agent 15.

Simultaneously, a loosely divided absorbent material 20, such as fluffed wood pulp, is carried by a distributor conveyor 21 to a distributor 22, which deposits the material in a layer of substantially uniform thickness on a first manufacturing conveyor 22. Web 11 moves downwardly from applicator 13 and is deposited on the upper surface of the layer of material 20 to form a two-ply laminate. This laminate is then carried by conveyor 22 between a pair of rollers 24 which press the web and absorbent material layer together lightly to promote intimate contact therebetween. The laminate is then carried by conveyor 22 through a drying oven 25, in which bonding agent 15 is cured to bond the fibers of web 11 to each other and to absorbent material 20.

To make a three-ply pad, having non-woven fiber backing plies on both sides of the absorbent material layer, the web deposition, pressing and curing steps described above can be repeated with a second non-woven fiber web. The other side of the layer of material 20 is exposed for the deposition thereon of the second web by reversing means, such as a reversing conveyor 26 and a cooperating extension of a second manufacturing conveyor 27. A second non-woven fiber web 31 is carried by a delivery conveyor 32 to a second bonding agent applicator 33, which has rolls 34 and a tank 36 in which a supply of a bonding agent 35, which preferably is of the same composition as bonding agent 15, is disposed. The saturated web 31 is then deposited on the exposed side of the layer of material 20. The resulting three-ply laminate is then lightly pressed together by cooperating rollers 44, and passed through an oven 45 to cure bonding agent 35 and complete the manufacture of the three-ply pad. If only a three-ply pad is to be made, oven 25 can be eliminated so that the bonding agent applied to both of webs 11 and 31 is cured in oven 45. The pad exits from oven 45 and is carried to further processing stations, such as cutting and packaging stations. The three-ply pad constructed in accordane with the above-described method is illustrated in FIG. 2.

The method of the invention can be performed by apparatus other than that above described. However, no papermaking machinery is required to perform the method, thus significantly reducing the cost of the absorbent pads made thereby as compared to the pads made by the prior art methods.

The basic raw materials utilized in the method preferably are fluffed wood pulp for the absorbent material, and relatively long synthetic or natural fibers, such as rayon or cotton fibers of 1.5–3 inches in length, for the non-woven fiber webs. The resulting pad has at least one strong soft and abrasive-resistant surface with a very absorbent inner core. Moreover, due to the relatively low cost of the pad, it is ideally suited for disposal after a single use.

It is understood that various modifications may be effected in the method of the invention as specifically described above without departing from the scope thereof as defined in the appended claims.

I claim:

1. A method of making an absorbent pad comprising the steps of:
   applying a bonding agent to a first non-woven fiber web having the fibers thereof oriented principally in a first direction;
   depositing said first web on the upper surface of a layer of loose absorbent material;
   reversing said absorbent material layer so that the lower surface thereof becomes the new upper surface;
   applying said bonding agent to a second non-woven fiber web having the fibers thereof oriented principally in a second direction substantially perpendicular to said first direction;
   depositing said second web on the new upper surface of the reversed absorbent material layer; and
   curing said bonding agent to bond the fibers of said first web to each other and to said absorbent material and to bond the fibers of said second web to each other and to said absorbent material.

2. The method of claim 1, further comprising the step of pressing said second web and said absorbent material layer together prior to said second-mentioned curing.

3. The method of claim 1, wherein said absorbent material is fluffed wood pulp.

4. The method of claim 1, wherein said web is made from fibers having a length in the range of 1.5–3 inches.

5. The method of claim 4, wherein said fibers are made from rayon.

6. The method of claim 4, wherein said fibers are made from cotton.

7. A method of making an absorbent pad comprising the steps of:
  applying a bonding agent to a first non-woven fiber web having the fibers thereof oriented principally in a first direction;
  depositing said first web on the upper surface of a layer of loose absorbent material;
  partially curing said bonding agent to establish adhesion between said first web and said loose absorbent material layer;
  reversing said absorbent material layer so that the lower surface thereof becomes the new upper surface;
  applying said bonding agent to a second non-woven fiber web having the fibers thereof oriented principally in a second direction substantially perpendicular to said first direction;
  depositing said second web on the new upper surface of the reversed absorbent material layer; and
  completely curing said bonding agent to bond the fibers of said first web to each other and to said absorbent material and to bond the fibers of said second web to each other and to said absorbent material.

8. The method of claim 7, further comprising the steps of pressing said first web and absorbent material layer together prior to said partial curing, and pressing said second web and absorbent material layer together prior to said complete curing.

9. The method of claim 7, wherein said absorbent material is fluffed wood pulp.

10. The method of claim 7, wherein said web is made from fibers having a length in the range of 1.5–3 inches.

11. The method of claim 10, wherein said fibers are made from rayon.

12. The method of claim 10, wherein said fibers are made from cotton.

References Cited
UNITED STATES PATENTS

| | | | |
|---|---|---|---|
| 2,698,271 | 12/1954 | Clark | 264—113 |
| 3,580,253 | 5/1971 | Bernardin | 161—156 X |

EDWARD G. WHITBY, Primary Examiner

U.S. Cl. X.R.

156—276, 309; 161—155, 156; 264—112